July 1, 1969 P. M. KOECHLIN 3,453,350

MATTRESS AND THE METHOD FOR PRODUCING SAME

Filed Nov. 22, 1965

INVENTOR

PIERRE M. KOECHLIN

BY Emory L. Groff Jr.

ATTORNEY

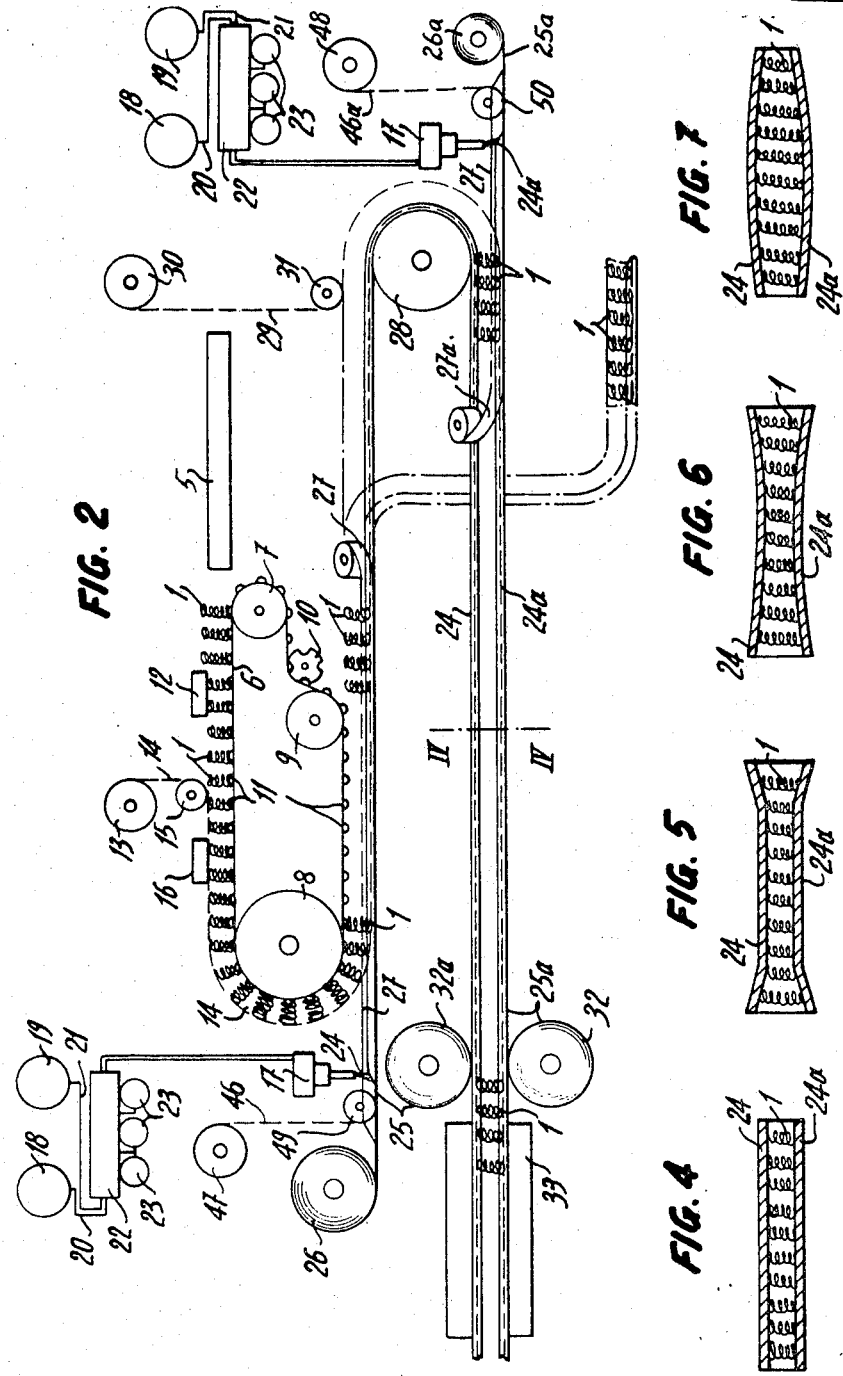

United States Patent Office 3,453,350
Patented July 1, 1969

3,453,350
MATTRESS AND THE METHOD FOR PRODUCING SAME
Pierre Maurice Koechlin, Geneva, Switzerland, assignor to S.A. Libresa, Geneva, Switzerland, a corporation of Switzerland
Filed Nov. 22, 1965, Ser. No. 509,048
Claims priority, application Switzerland, Nov. 26, 1964, 15,297/64
Int. Cl. B29d 27/00
U.S. Cl. 264—45          7 Claims

ABSTRACT OF THE DISCLOSURE

The invention is directed to the continuous production of mattresses wherein the springs are secured temporarily to a movable endless conveyor and are embedded in a layer of plastic sponge material releasably carried by a strip which is moved parallel to the endless conveyor. The ends of the springs secured to the endless conveyor are automatically released and after embedment of their other ends in the plastic and the strip continues to be moved to a point where the carrier strip is removed from the sponge material which is polymerized by exposure to the air to the point where it is self-supporting. The thus formed carcass is fed through a heating kiln for further polymerization of the sponge material and is then cut to any desired length and covered with an appropriate covering material.

---

The present invention has for its object a method for producing a mattress, chiefly of the type including a carcass formed of springs.

Spring mattresses are already known, the body of which comprises a carcass of metal springs grouped into sections which are generally enclosed inside jute covers. Generally, such spring sections enclosed in corresponding covers are assembled to form a body coated on both main surfaces by a layer of yielding material made of animal or vegetable fibres such as coconut fibres, horsehair or even wool. This being done, an outer cover made of fabric encloses the whole arrangement so as to form the finished mattress. Such a method of producing mattresses is expensive and it furthermore has the drawback consisting in that the mattress obtained retains the odor of the material used as a coating layer, in particular in the case of vegetable imitation horsehair. Furthermore, such layers collapse after a short period of use.

Other types of mattresses are known, which are not provided with a spring carcass, but instead the elastic body is formed of sponge latex or of a synthetic sponge material. Such an elastic body is merely enclosed inside a canvas cover. Such mattresses, although their feel is soft and they appear advantageous at first sight, have the drawback of quickly losing their elasticity when they are subjected to load.

Now, the method for producing mattresses according to the present invention eliminates the drawbacks of the two above-mentioned types of mattresses. According to said invention, the springs are laid transiently on a temporary movable support and are distributed thereon in accordance with the final desired distribution of the springs, while a layer of a plastic sponge material is injected over at least one movable carrier strip, after which the movable spring-carrying support and the movable strip carrying the sponge layer are shifted in parallelism with each other so as to urge the springs into engagement with the sponge material and the sponge material is polymerized at a raised temperature, following which the yielding structure formed by the springs embedded in the sponge material is cut to the size of the desired mattresses, whereby a continuous production of mattresses is obtained.

The present invention has also for its object a mattress of the type including a carcass made of springs wherein at least one end of said springs is embedded within a layer of plastic sponge material forming at least one facing of the mattress.

The accompanying drawings illustrate diagrammatically and by way of example an embodiment of the method according to the invention. In said drawings:

FIG. 2 is an elevational diagrammatic illustration of the successive operative steps, starting from the laying of the springs according to a predetermined pattern up to the formation at the output of a continuous string of adjacent mattresses.

FIG. 4 is a sectional view through line IV—IV of FIG. 2 showing the cross-section which may be given to the continuously formed mattresses.

FIGS. 5 to 7 are sectional views similar to FIG. 4 showing various modifications in the cross-sectional shape to be given to the mattresses.

Figure 1:
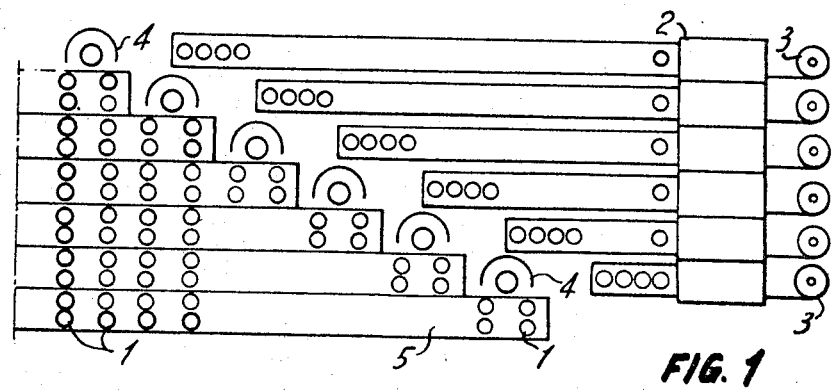
FIG. 1 is a plan view showing the first stage of the continuous production of mattresses according to the invention, said stage consisting in arranging the springs in accordance with the selected distribution thereof in the finished mattress.

The novel method for the continuous production of mattresses starts with the production of springs 1 by means of automatic machines 2 provided for such purposes. Said machines 2 form the springs 1 in mass production, starting from pads 3 of steel wire. As illustrated in FIG. 1, each spring-producing machine 2 feeds an operator 4 who lays the springs on a carrier strip 5 in accordance with a predetermined arrangement.

Generally speaking, in the case of mattresses the carcass of which is formed by springs, the springs located along the edges of the mattress are neither of a greater height or show a higher resistance against flexional stresses. In the example illustrated in FIG. 1, the distribution of the springs which may be frusto-conical or double cone-shaped coil springs or else blade springs is performed manually by a number of operators 4. Of course, said distribution may also be performed automatically by a suitable machine.

The springs 1 when they have been distributed throughout the area comprising a carrier surface 5, are laid on a temporary support comprising, in the case illustrated, by a continuous conveyor strip 6 passing over the guiding wheels 7, 8, 9 and driven by a toothed driving wheel 10 (FIG. 2). Said strip 6 carries a number of securing studs 11 over which the springs 1 may be locked automatically as soon as one of their ends is fitted over a stud. Each stud 11 may be provided with elastic claws adapted to engage the first convolution of a spring 1 so as to hold the latter securely on the strip 6. In the section 12 of the path followed by the strip 6, the strings tensioning the springs 1 are laid over said springs. Around a drum 13 is wound a jute canvas sheet 14 with loose meshes, said meshes measuring approximately 5 x 5 mm., said drum being adapted to unwind said canvas sheet during the progression of the strip 6. A transmission roller 15 urges the canvas sheet 14 over the upper ends of the springs 1 which have been subjected to a preliminary tensioning by the strings. In the section 16 of the path of the springs, the jute canvas sheet is caused automatically or manually to engage the openings formed by the springs 1.

In proximity with the guiding wheel 8, there are positioned one or more injection nozzles 17 fed with the components of a synthetic material out of the two main containers 18 and 19. The container 18 carries a polyether for instance, whereas the container 19 contains, say diisocyanate of toluene. Said containers 18 and 19 are connected through pipes 20 and 21 with an apparatus 22 measuring out the amounts of the two chemical products passing out of the two containers 18 and 19. Other containers 23 also feed the measuring apparatus with activating products or catalysts adapted to further the polymerization of the plastic sponge material 24 formed at the output of the injection nozzles 17. Said plastic sponge is distributed in a continuous manner over the movable strip 25 such as kraft paper incorporating silicones and fed off a drum 26. Said paper strip 25 is designed so as to include two raised edges 27 giving it the shape of a trough retaining the plastic sponge 24 in position. Said strip of paper 25 is guided by a cylinder 28 so as to progress in a direction parallel with the side of the spring-carrying strip 6 which has passed over the guiding drum 8 and moves in a direction opposed to its upper side. The strips 6 and 25 are adjusted in a manner such that the free ends of the springs 1 and also the jute canvas sheet 14 covering them may engage the layer of sponge material 24 formed on the strip 25.

Along the path followed by the strip 6 between the guiding wheels 8 and 9, the plastic sponge material 24 is polymerized in the presence of air. When the strip 6 passes over the wheel 9, the springs 1 are released with reference to the studs 11 and move away from the strip 6. The raised edges 27 of the paper strip 25 are then cut off and wound laterally of said strip 25. The springs 1 of the continuous mattress string obtained are then carried along by the upper surface of the plastic sponge material and, before the strip 25 passes over the guiding cylinder 28, a second sheet of jute 29 with broad meshes similar to the sheet 14 is wound off a drum 30 and guided by a cylinder 31 so as to be urged over the free ends of the springs 1 and to be secured thereto.

In proximity with the guiding wheel 28, may be located a second apparatus for distributing plastic sponge material 24a. Said second apparatus therefore includes the same elements 17 to 23 as the above-described distributing apparatus located in the vicinity of the wheel 8. A further carrier strip of paper 25a made of kraft paper including silicones, which strip serves transiently only, is wound off a drum 26a. The edges 27 of said strip 25a are also raised into trough formation. Said second strip 25a is guided between the drum 26a and a winding drum 32. Another winding drum 32a is provided for winding the first strip of paper 25 after it has passed over the guiding wheel 28.

After the continuous string of mattresses has passed over the guiding wheel 28, only one side of the strip being then provided with a layer of sponge material 24, the outer ends of the springs 1 carried by it engage the second layer of sponge material 24a carried by the strip 25a. The jute canvas sheet 29 is also immersed in said second layer of sponge material 24a. After the continuously formed mattress has progressed, by a predetermined amount, so as to allow a polymerization in the presence of air of the second layer of sponge material 24a, the edges 27a of the paper strip 25a are cut off and wound transversely of said strip. The polymerization in the presence of air continues until the string of mattresses obtained has passed between the drums 32 and 32a round which the paper strips 25 and 25a are wound, so as to release the actual mattresses. The mattress string obtained passes then inside a tunnel-shaped kiln 33 ensuring the final polymerization of the plastic sponge material and also the heat treatment of the springs.

Figure 3:
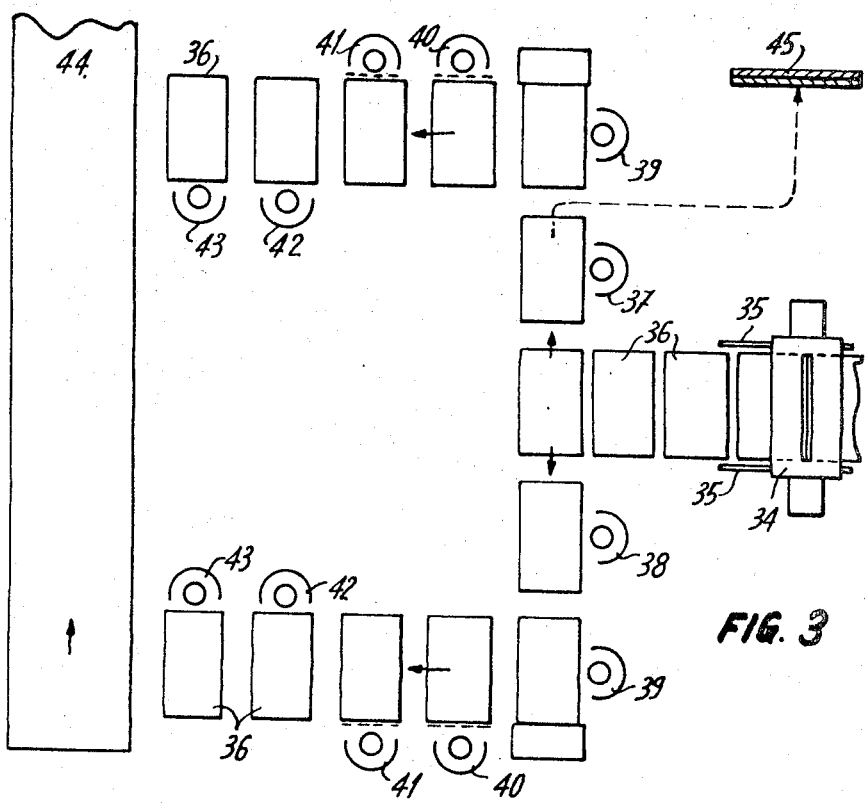
FIG. 3 illustrates the area wherein the string of adjacent mattresses is cut into a succession of independent mattresses.

At the outlet of the tunnel-shaped kiln 33, the continuous string of mattresses is cut by a saw or by a knife 34 carried by rails 35 (FIG. 3) so as to move together with the mattress string. The independent cut sections forming the different mattresses 36 are then distributed between two stations 37 and 38 wherein the originally laid spring-tensioning strings are cut off the severed mattress ends; each mattress passes then through a further station 39 where a cover is laid over it after the manner of a bag. The closing of the cover is performed at the further stations 40 and 41 while the finished mattresses are packed at the stations 42 and 43, following which the mattresses 36 may be removed over the track 44 leading them to the storing place.

According to a modification, instead of the mattresses passing say from the station 37 to the corresponding station 39 for their insertion inside a cover, the mattresses may be compressed at 45 so as to further their insertion in bags or covers and their transportation towards the warehouses.

According to a further modification, it is possible to resort, for the covering of both sides of the mass of plastic sponge material forming the mattresses, to a plasticized covering fabric which has been subjected for instance to a printing at a high frequency. Said fabric 46 or 46a could be unwound off a drum 47 or 48 at either end of the arrangement illustrated in FIG. 2 onto corresponding surfaces of the mattress string.

Such strips of fabric 46 and 46a can be guided by corresponding cylinders 49 and 50. These strips of fabric 46 and 46a replace in such a case the strips of silicone-carrying kraft paper 25 and 25a, so as to produce thus cheap mattresses. Of course, the two strips of fabric 46 and 46a should be interconnected along the edges of the continuous mattress string, after which the whole arrangement passes through the tunnel-shaped kiln 33 and is cut into sections by the sawing means 34 as disclosed hereinabove.

The improved method disclosed allows also producing a continuous mattress string, carrying plastic sponge material 24 only on one side, which may be of interest for the execution of box mattresses for instance. In such a case, the mattress string is fed as it passes beyond the wheel 9 directly into the tunnel-shaped kiln, so as to ensure the polymerization of the sponge material and the heat treatment of the springs.

FIG. 4 which is a transverse cross-section of the continuous mattress string through line IV—IV of FIG. 2 shows that in the first embodiment illustrated, the temporary paper strips 25 and 25a were guided by the drums 26, 28, 32a and 26a, 32 so that the two sides of the continuous mattress string may be parallel with each other. Said method allows, in fact, giving any desired cross-section to the continuous mattress string, as illustrated in FIGS. 5 to 7. It is sufficient, as a matter of fact, when it is desired to obtain such a modification in the cross-section of the mattress, to give a corresponding shape to the drums guiding the strip of paper 25 and 25a or the strips of fabric 46 and 46a.

The above-described method allows erecting with a small staff and over a small area a unit producing mattresses with a large yield. Assuming for instance that the progression of the strips or mattress string is adjusted so as to be equal to 2.5 m. per minute such a producing unit may easily lead to a daily output of one thousand mattresses of a breadth of 120 cm. By reason of the small bulk required for such a producing unit, the mattresses may be produced in different localities and be caused to supply a number of mattresses corresponding to the requirements of such localities. A master plant may be provided for producing the finished auxiliaries provided by the finishing covers which would thereafter be distributed between the finishing units.

When compared with the conventional mattress-producing methods, the above-described method allows eliminating the stocks of cotton wool, horsehair, canvas and the dust produced thereby. The method described also allows folding the mattresses and furthermore the springs 1 may also form sections inserted in corresponding bags.

The method disclosed allows producing mattresses in any desired size and of any desired yieldingness, the yieldingness varying in fact if desired at two points for each of them. The improved method allows also producing cheap mattresses the outer coat of which comprises a plasticized fabric which as been previously ornamented by high frequency welding operations or else through impression when the carcass has been brought to a finish.

When compared with the conventional methods for producing mattresses, said novel method allows eliminating the odor produced by horsehair or imitation vegetable horsehair and eliminating also the connecting slubs and the noise produced by the latter when the mattress is subjected to load. By reason of the novel assembly proposed, the data governing the springs 1 may be observed with broad allowances so that it is possible to make use of less expensive steel wire or the like raw material. It is even possible to cut out a number of springs since the plastic sponge material cooperates in the elastic resistance of the mattress against crushing. As to the facing, it is reduced to a miximum extent since the mattress is inserted in a cover which may be closed in the manner of a bag.

A still further advantage of the invention consists in a speedy manufacture of mattresses of which the sides are rectilinear and sharp-edged, this being obtained through the fact that the plastic sponge material is moulded. Since the mattresses obtained are less heavy than the mattresses of a conventional execution, it is also possible to eliminate at least on cheap mattresses the handles through which they are generally carried. These mattresses may also be compressed for transportation so that the transportation cost is reduced.

I claim:

1. A method for the continuous production of spring mattresses comprising the steps of:
   continuously advancing an endless movable support,
   laying the springs on said advancing movable support in accordance with the desired final distribution of said springs, and provisionally fastening one end of each spring to said support,
   continuously advancing a conveyor strip at the same speed as said movable support,
   continuously feeding onto said advancing conveyor strip a layer of plastic sponge-forming material,
   bringing said spring-carrying advancing support and said layer-carrying advancing strip into parallel, spaced apart, superimposed relationship, in which they travel in the same sense and in which the spacing between them is in the neighborhood of the height of the springs, whereby the other ends of the springs, of which said one ends are provisionally fastened to said advancing support, are urged into said layer on said advancing strip,
   polymerizing the layer of sponge-forming material to form a layer of sponge material,
   moving said advancing support and said advancing strip away from each other, after the polymerization has at least partially taken place, whereby said springs are unfastened from said support but remain held by said at least partially solidified layer of sponge material,
   and cutting the continuous sheet obtained to the desired mattress size.

2. A method as claimed in claim 1 comprising the further steps, before the step of cutting the continuous sheet obtained, of:
   continuously advancing a second conveyor strip of the same speed as the first conveyor strip,
   continuously feeding onto said second advancing conveyor strip a layer of plastic sponge-forming material,
   bringing the spring-carrying first advancing strip and the layer-carrying second advancing strip into parallel, spaced-apart, superimposed relationship, in which they travel in the same sense and in which the spacing between them is in the neighbourhood of the height of the springs, whereby said one ends of the springs, of which said other ends are held by said at least partially polymerized layer of sponge material, are urged into said layer on said second advancing strip,
   polymerizing the layer of sponge-forming material on said second advancing strip to form a layer of sponge material,
   and removing both conveyor strips after the polymerization has at least partially taken place.

3. In a method as claimed in claim 1, the steps of subjecting the springs to a tensioning and covering their said other ends with canvas before they are urged into the sponge-forming material.

4. In a method as claimed in claim 1 the step of removing the conveyor strip off the polymerized spring-carrying layer.

5. In a method as claimed in claim 1, the use of a conveyor strip made of plasticized covering fabric adapted to adhere permanently to the plastic sponge material.

6. In a method as claimed in claim 1, the step of inserting the finished mattress cut out of the continuous sheet obtained inside a cover.

7. Apparatus for the continuous production of spring mattresses, comprising:
   an endless movable support adapted to be continuously advanced,
   means for bringing springs to said support to be distributed over said support in accordance with a predetermined pattern, with one end of each spring provisionally fastened to said support,
   advancing means for continuously advancing a conveyor strip at the same speed as said support,
   feeding means for feeding onto said advancing strip a layer of synthetic polymerizable sponge-forming material,
   means for bringing the spring-carrying advancing support and the layer-carrying advancing strip into parallel, spaced-apart, superimposed relationship, in which they travel in the same sense and in which the spacing between them is in the neighbourhood of the height of the springs, for urging the other ends of said springs, of which said one ends are provisionally fastened to said advancing support, into said layer on said advancing strip,
   means for moving said advancing support and said advancing strip away from each other, after polymerization of said layer of sponge-forming material has at least partially taken place, for unfastening said springs from said suport while they remain held by said at least partially polymerized layer of sponge material,
   and cutting means for cutting the continuous sheet obtained to the desired mattress size.

References Cited

UNITED STATES PATENTS 2,874,389   2/1959   Koenigsberg     5—351
3,090,154   5/1963   Harris     5—351

JULIUS FROME, *Primary Examiner.*

LEON M. GARRETT, *Assistant Examiner.*

U.S. Cl. X.R.

18—4, 5; 264—47, 54